United States Patent
Geisler et al.

(10) Patent No.: US 12,030,810 B2
(45) Date of Patent: Jul. 9, 2024

(54) THERMAL INSULATING COMPOSITION BASED ON FUMED SILICA GRANULATES, PROCESSES FOR ITS PREPARATION AND USES THEREOF

(71) Applicant: EVONIK OPERATIONS GMBH, Essen (DE)

(72) Inventors: Matthias Geisler, Nörten-Hardenberg (DE); Maria Nargiello, Piscataway, NJ (US); Bettina Gerharz-Kalte, Hünfelden (DE); Björn Lazar, Hasselroth (DE); Uwe Numrich, Gross-Zimmern (DE); Ulrich Boes, Frankfurt a.M. (DE); Bob Tse-Weng Lin, Branchburg, NJ (US); Craig Biesiada, South Amboy, NJ (US)

(73) Assignee: Evonik Operations GmbH, Essen (DE)

( * ) Notice: Subject to any disclaimer, the term of this patent is extended or adjusted under 35 U.S.C. 154(b) by 794 days.

(21) Appl. No.: 17/260,227

(22) PCT Filed: Jul. 8, 2019

(86) PCT No.: PCT/EP2019/068190
§ 371 (c)(1),
(2) Date: Jan. 14, 2021

(87) PCT Pub. No.: WO2020/016034
PCT Pub. Date: Jan. 23, 2020

(65) Prior Publication Data
US 2021/0269359 A1   Sep. 2, 2021

Related U.S. Application Data

(60) Provisional application No. 62/699,187, filed on Jul. 17, 2018.

(51) Int. Cl.
| | | |
|---|---|---|
| C04B 18/14 | (2006.01) | |
| C04B 20/10 | (2006.01) | |
| C04B 28/02 | (2006.01) | |
| C04B 111/52 | (2006.01) | |

(52) U.S. Cl.
CPC ........ C04B 18/147 (2013.01); C04B 20/1051 (2013.01); C04B 28/02 (2013.01); C04B 2111/52 (2013.01); C04B 2201/32 (2013.01)

(58) Field of Classification Search
CPC ... C04B 18/147; C04B 20/1051; C04B 35/14; C04B 35/62695; C04B 41/0072; C04B 41/4535; C04B 41/4519; C04B 41/4922
See application file for complete search history.

(56) References Cited

U.S. PATENT DOCUMENTS

| | | | |
|---|---|---|---|
| 2,595,262 A | 5/1952 | Hood | |
| 3,532,473 A | 10/1970 | Biegler et al. | |
| 3,574,027 A | 4/1971 | Bonnet | |
| 3,837,878 A * | 9/1974 | Beers | C09C 1/309 |
| | | | 106/490 |
| 4,048,290 A | 9/1977 | Lee | |
| 4,175,159 A | 11/1979 | Raleigh | |
| 4,212,925 A | 7/1980 | Kratel et al. | |
| 4,247,708 A | 1/1981 | Tsutsumi et al. | |
| 4,276,274 A | 6/1981 | Heckel | |
| 4,286,990 A | 9/1981 | Kleinschmidt et al. | |
| 4,297,143 A | 10/1981 | Kleinschmidt et al. | |
| 5,000,888 A * | 3/1991 | Kilbride, Jr. | A61K 9/16 |
| | | | 514/251 |
| 5,086,031 A | 2/1992 | Deller et al. | |
| 5,183,710 A | 2/1993 | Gerbino | |
| 5,362,541 A | 11/1994 | Sextl et al. | |
| 5,458,916 A | 10/1995 | Kratel et al. | |
| 5,556,689 A | 9/1996 | Kratel et al. | |
| 5,565,142 A | 10/1996 | Deshpande et al. | |
| 5,589,245 A | 12/1996 | Roell | |
| 5,685,932 A | 11/1997 | Stohr et al. | |
| 5,776,240 A | 7/1998 | Deller et al. | |
| 5,851,715 A | 12/1998 | Barthel et al. | |
| 6,099,749 A | 8/2000 | Boes et al. | |
| 6,174,926 B1 | 1/2001 | Menon et al. | |
| 6,268,423 B1 | 7/2001 | Mayer et al. | |
| 6,303,256 B1 | 10/2001 | Kerner et al. | |
| 6,472,067 B1 | 10/2002 | Hsu et al. | |

(Continued)

FOREIGN PATENT DOCUMENTS

| | | |
|---|---|---|
| CA | 2 201 186 | 9/1997 |
| CN | 106830878 | 6/2017 |

(Continued)

OTHER PUBLICATIONS

Notice of Allowance for copending U.S. Appl. No. 16/478,169, mailed Sep. 28, 2022.
International Search Report for corresponding PCT/EP2019/068190 filed Jul. 8, 2019.
Written Opinion of the International Searching Authority for corresponding PCT/EP2019/068190 filed Jul. 8, 2019.
International Preliminary Report on Patentability for for corresponding PCT/EP2019/068190 filed Jul. 8, 2019.
Mathias, et al., "Basic characteristics and applications of aerosil: 30. The chemistry and physics of the aerosil surface," *Journal of Colloid and Interface Science* 125:61-68 (1988).
Pajonk, et al., "Physical properties of silica gels and aerogels prepared with new polymeric precursors," *J. Non-Cryst. Solids* 186(2):1-8 (Jun. 1995).

(Continued)

*Primary Examiner* — Matthew E. Hoban
(74) *Attorney, Agent, or Firm* — Law Office of: Michael A. Sanzo, LLC

(57) ABSTRACT

The present invention relates to a thermal insulating composition, containing 5 to 60% by weight of a hydrophobized granular material comprising fumed silica and at least one IR-opacifier, and 40 to 95% by weight of an inorganic and/or an organic binder, whereby the hydrophobized granular material has a content of free hydroxyl groups of no greater than 0.12 mmol/g, as determined by the reaction with lithium aluminium hydride.

20 Claims, No Drawings

(56) References Cited

U.S. PATENT DOCUMENTS

| | | | |
|---|---|---|---|
| 7,241,336 B2 | 7/2007 | Scharfe et al. | |
| 7,562,534 B2 | 7/2009 | Jibb et al. | |
| 7,674,476 B1 | 3/2010 | Schwertfeger et al. | |
| 7,780,937 B2 | 8/2010 | Meyer et al. | |
| 7,842,269 B2 | 11/2010 | Schachtely et al. | |
| 7,855,248 B2 | 12/2010 | Stenzel et al. | |
| 8,333,946 B2 | 12/2012 | Gottschalk et al. | |
| 8,389,617 B2 | 3/2013 | Meyer et al. | |
| 8,512,595 B2 | 8/2013 | Meyer et al. | |
| 8,603,353 B2 | 12/2013 | Menzel et al. | |
| 8,962,519 B2 | 2/2015 | Heindl et al. | |
| 9,055,748 B2 | 6/2015 | Feucht et al. | |
| 9,233,986 B2 | 1/2016 | Kratel et al. | |
| 9,540,247 B2 | 1/2017 | Stenzel et al. | |
| 9,593,797 B2 | 3/2017 | Kulprathipanja et al. | |
| 9,784,402 B2 | 10/2017 | Menzel | |
| 9,878,911 B2 | 1/2018 | Maisels et al. | |
| 10,179,751 B2 * | 1/2019 | Geisler | C04B 41/009 |
| 10,618,815 B2 | 4/2020 | Hindelang et al. | |
| 10,618,849 B2 | 4/2020 | Albinus et al. | |
| 11,427,506 B2 | 8/2022 | Schultz et al. | |
| 11,565,974 B2 * | 1/2023 | Geisler | C04B 41/4933 |
| 2003/0095905 A1 | 5/2003 | Scharfe et al. | |
| 2006/0027227 A1 | 2/2006 | Everett et al. | |
| 2007/0220904 A1 | 9/2007 | Jibb et al. | |
| 2008/0277617 A1 * | 11/2008 | Abdul-Kader | C04B 30/00 252/62 |
| 2010/0146992 A1 | 6/2010 | Miller | |
| 2010/0300132 A1 | 12/2010 | Schultz | |
| 2012/0064345 A1 | 3/2012 | Gini | |
| 2012/0286189 A1 | 11/2012 | Barthel et al. | |
| 2013/0071640 A1 | 3/2013 | Szillat | |
| 2014/0150242 A1 * | 6/2014 | Kratel | C07F 7/025 29/527.1 |
| 2014/0230698 A1 | 8/2014 | Stepp et al. | |
| 2015/0000259 A1 | 1/2015 | Dietz | |
| 2016/0082415 A1 | 3/2016 | Drexel et al. | |
| 2016/0084140 A1 | 3/2016 | Dietz | |
| 2016/0223124 A1 | 8/2016 | Kulprathipanja et al. | |
| 2016/0258153 A1 | 9/2016 | Koebel et al. | |
| 2016/0326003 A1 | 11/2016 | Ishizuka et al. | |
| 2017/0233297 A1 | 8/2017 | Albinus et al. | |
| 2017/0268221 A1 | 9/2017 | Geisler et al. | |
| 2017/0306106 A1 * | 10/2017 | Xiong | C08J 3/215 |
| 2018/0001576 A1 | 1/2018 | Koebel et al. | |
| 2018/0065892 A1 * | 3/2018 | Geisler | C04B 41/64 |
| 2019/0002356 A1 | 1/2019 | Hebalkar et al. | |
| 2019/0276358 A1 * | 9/2019 | Schultz | C04B 18/02 |
| 2019/0382952 A1 | 12/2019 | Geisler et al. | |
| 2020/0031720 A1 | 1/2020 | Geisler et al. | |
| 2020/0062661 A1 | 2/2020 | Geisler et al. | |
| 2020/0124231 A1 | 4/2020 | Geisler et al. | |
| 2021/0039954 A1 | 2/2021 | Numrich et al. | |
| 2021/0292233 A1 | 9/2021 | Numrich et al. | |
| 2021/0292238 A1 | 9/2021 | Albinus et al. | |

FOREIGN PATENT DOCUMENTS

| | | | |
|---|---|---|---|
| CN | 107814552 | 3/2018 | |
| DE | 952 891 | 11/1956 | |
| DE | 25 33 925 | 2/1977 | |
| DE | 30 37 409 | 5/1982 | |
| DE | 199 48 394 | 2/2001 | |
| DE | 20 2007 013 074 | 3/2008 | |
| DE | 10 2007 020 716 | 11/2008 | |
| DE | 10 2007 031 635 | 1/2009 | |
| DE | 10 2007 042 000 | 3/2009 | |
| DE | 10 2007 051 830 | 5/2009 | |
| DE | 10 2008 005 548 | 7/2009 | |
| DE | 10 2008 036 430 | 2/2010 | |
| DE | 10 2010 040 346 | 3/2012 | |
| DE | 10 2013 016 705 | 4/2015 | |
| DE | 10 2014 203 091 | 8/2015 | |
| EP | 0 032 176 | 7/1981 | |
| EP | 0 340 707 | 11/1989 | |
| EP | 0 645 576 | 3/1995 | |
| EP | 0 647 591 | 4/1995 | |
| EP | 0 937 755 | 8/1999 | |
| EP | 1 700 824 | 9/2006 | |
| EP | 1988228 | 11/2008 | |
| EP | 2 028 329 | 2/2009 | |
| EP | 2 204 513 | 7/2010 | |
| EP | 2 910 724 | 8/2015 | |
| EP | 3 403 818 | 11/2018 | |
| FR | 2873677 | 2/2006 | |
| GB | 919 018 | 2/1963 | |
| NO | 621873 | 4/2018 | |
| WO | WO 99/05447 | 2/1999 | |
| WO | WO 01/12731 | 2/2001 | |
| WO | WO 03/064025 | 8/2003 | |
| WO | WO2005028195 | 3/2005 | * |
| WO | WO 2006/097668 | 9/2006 | |
| WO | WO2010126792 | 11/2010 | * |
| WO | WO 2011/076518 | 6/2011 | |
| WO | WO2011066209 | 6/2011 | * |
| WO | WO 2011/083174 | 7/2011 | |
| WO | WO 2012/041823 | 4/2012 | |
| WO | WO 2012/044052 | 4/2012 | |
| WO | WO 2013/053951 | 4/2013 | |
| WO | WO 2014/090790 | 6/2014 | |
| WO | WO 2014/095277 | 6/2014 | |
| WO | WO 2015/007450 | 1/2015 | |
| WO | WO 2016/045777 | 3/2016 | |
| WO | WO 2016/171558 | 10/2016 | |
| WO | WO 2017/097768 | 6/2017 | |
| WO | WO 2017/102819 | 6/2017 | |

OTHER PUBLICATIONS

Somana, Chotangada Gautham, "Evaluation of Aerogel Composite Insulations by Characterization and Experimental Methods," Thesis; B.Eng., R.V. College of Engineering, Banglore, India, (2012).

Schreiner, et al., "Intercomparison of thermal conductivity measurements on an expanded glass granulate in a wide temperature range," *International Journal of thermal Sciences* 95:99-105 (2015).

Ulmann's Encyclopedia of Industrial Chemistry, "Silica" chapter, published online on Apr. 15, 2008, DOI: 10.1002/14356007.a23_583.pub3.

U.S. Appl. No. 16/339,081, filed Apr. 3, 2019, US-2019/0276358 A1, Sep. 12, 2019, Schultz.

U.S. Appl. No. 16/478,169, filed Jul. 16, 2019, US-2020/0031720 A1, Jan. 30, 2020, Geisler.

U.S. Appl. No. 16/484,368, filed Aug. 7, 2019, US-2019/0382952 A1, Dec. 9, 2019, Geisler.

U.S. Appl. No. 16/605,342, filed Oct. 15, 2019, US-2020/0062661 A1, Feb. 27, 2020, Geisler.

U.S. Appl. No. 16/620,481, filed Dec. 6, 2019, US-2020/0124231 A1, Apr. 23, 2020, Geisler.

U.S. Appl. No. 16/978,164, filed Sep. 3, 2020, US-2021/0039954 A1, Feb. 11, 2021, Numrich.

U.S. Appl. No. 17/260,345, filed Jan. 14, 2021, Numrich.

U.S. Appl. No. 17/260,371, filed Jan. 14, 2021, Albinus.

Amendment & Response to Final Office Action for copending application U.S. Appl. No. 16/478,169, filed Sep. 19, 2022.

Restriction Requirement for copending application U.S. Appl. No. 16/478,169, mailed Dec. 8, 2021.

Response to Restriction Requirement for copending application U.S. Appl. No. 16/478,169, filed Jan. 31, 2022.

Amendment to Accompany Response to Restriction Requirement for copending application U.S. Appl. No. 16/478,169, filed Jan. 31, 2022.

Non Final Office Action for copending application U.S. Appl. No. 16/478,169, mailed Mar. 2, 2022.

U.S. Appl. No. 17/802,656, filed Aug. 26, 2022, Gärtner.

Response to Non Final Office Action for copending application U.S. Appl. No. 16/478,169, filed Jun. 1, 2022.

(56) References Cited

OTHER PUBLICATIONS

Final Office Action for copending application U.S. Appl. No. 16/478,169, mailed Jun. 29, 2022.
U.S. Appl. No. 17/792,400, filed Jul. 31, 2022, Lazar.
U.S. Appl. No. 17/792,471, filed Jul. 13, 2022, Menzel.

* cited by examiner

THERMAL INSULATING COMPOSITION BASED ON FUMED SILICA GRANULATES, PROCESSES FOR ITS PREPARATION AND USES THEREOF

CROSS REFERENCE TO RELATED APPLICATIONS

The present application is US national stage of international application PCT/EP2019/068190, which had an international filing date of Jul. 8, 2019 and which was published on Jan. 23, 2020. The application claims the benefit of U.S. 62/699,187, filed in on Jul. 17, 2018. The contents of the priority application is hereby incorporated by reference in its entirety.

The present invention relates to compositions based on silica granulates, to processes for production thereof and to use of such compositions for thermal or acoustic insulation.

Effective thermal insulation of houses, industrial plants, pipelines and suchlike is an important economic problem. The majority of insulation materials based on organic substances, such as polyurethane foams, are combustible and only usable at relatively low temperatures. These disadvantages are not exhibited by the hitherto less widespread thermal insulation materials based on inorganic oxides, for example highly porous silica. In the case of use of such materials for thermal insulation, by contrast, the optimization of the mechanical properties, for example particle size and mechanical stability, as well as compatibility with other components of thermal insulating systems play a major role.

Such silicon dioxide-based thermal insulation materials are typically based on what are called the aerogels, and also precipitated or fumed silicas. More detailed information relating to these silica types can be found in Ullmann's Encyclopedia of Industrial Chemistry, "Silica" chapter, published online on 15.04.2008, DOI: 10.1002/14356007.a23_583.pub3.

WO 2011/083174 A1 discloses a plaster that can be applied to the surface of a building to produce a thermally insulating coating, comprising water, a mineral and/or organic hydraulic binder and 0.5-65% by weight of a powder or granular material of at least one hydrophobic silica xerogel or aerogel.

WO 2011/066209 A1 discloses self-supporting rigid composites with a low thermal conductivity comprising aerogels and an inorganic binder, particularly a cementitious binder. The thermally insulating composites were produced by pouring an aqueous slurry in a suitably shaped mold and allowing them to harden.

WO 2010/126792 A2 discloses compositions with a thermal conductivity of no greater than 50 mW/(mK), comprising an aerogel component, a surfactant, either an inorganic or an inorganic binder-containing composition, e.g. cement, gypsum, lime, acrylate, and optionally other components.

WO 2014/090790 A1 discloses a dry blend for producing a thermally insulating rendering, comprising 60-90% by volume of a hydrophobized granular silica aerogel, 0.5-30% by volume of a purely mineral binder, 0.2-20% by volume of an open-porous water-insoluble additive, 0-5% by volume reinforcing fibers and 0-5% by volume processing additives. The thermally insulating rendering can be produced by mixing of such dry blend with water and subsequent hardening.

Silica aerogels, which due to their specific synthesis have pore structures well suitable for their application in thermal insulation, are well-established components of existing thermal insulating compositions. Unfortunately, aerogels are quite expensive, when compared with the other silica types, such as precipitated or fumed silica and possess inferior thermal insulation properties at elevated temperatures. Therefore, it would be desirable to develop alternative thermal insulating compositions based on other than aerogels silica types.

WO 2006/097668 A1 discloses a granular thermal insulation material comprising 30-95% by weight of a microporous insulating material, e.g. hydrophobic fumed silica, 5-70% by weight of an infrared opacifier material, 0-50% by weight of a particulate insulating filler material and 0-5% by weight of binder material, e.g. polyvinylalcohol, which is produced by mixing the components and subsequent densification to give granular material having a size of 0.25 to 2.5 mm. The free-flowing materials disclosed in WO 2006/097668 A1 are designed for usage in loose fillings for high temperature insulation applications.

A simple substitution of an aerogel material in the thermal insulation composition by a corresponding fumed silica material, e.g. by the one disclosed in WO 2006/097668 A1, would result in a higher thermal conductivity of the resulting composition. Although thermal insulation properties of such compositions can be improved to some extent by increasing the fumed silica loading, starting from a certain level, no more silica can be introduced, because of too high viscosity of the final composition. No thermal insulating composition based on fumed silica, which would provide a low thermal conductivity and a good applicability, has been reported so far.

The problem addressed by the present invention is that of providing a thermal insulating composition based on fumed silica. More specifically, the technical problem to be solved by the present invention is providing a thermal insulating composition with a relatively high fumed silica loading and a relatively low viscosity, which would on the one side provide a low thermal conductivity and, on the other hand, be well mixable and well applicable on the surface to be insulated.

This object was achieved by provision of a thermal insulating composition containing 5 to 60% by weight of a hydrophobized granular material comprising fumed silica and at least one IR-opacifier, and 40 to 95% by weight of an inorganic and/or an organic binder, whereby the hydrophobized granular material has content of free hydroxyl groups of no greater than 0.12 mmol/g, as determined by the reaction with lithium aluminium hydride.

In the present invention, the terms "granular material", "granulate" and "granules" are used as alternatives and are understood to mean a grainy, readily pourable, free-flowing solid material.

The hydrophobized granular material used in the composition of the invention comprises fumed silicon dioxide. Fumed silicas are prepared by means of flame hydrolysis or flame oxidation. This involves oxidizing or hydrolysing hydrolysable or oxidizable starting materials, generally in a hydrogen/oxygen flame. Starting materials used for pyrogenic methods include organic and inorganic substances. Silicon tetrachloride is particularly suitable. The hydrophilic silica thus obtained is amorphous. Fumed silicas are generally in aggregated form. "Aggregated" is understood to mean that what are called primary particles, which are formed at first in the genesis, become firmly bonded to one another later in the reaction to form a three-dimensional network. The primary particles are substantially free of pores and have free hydroxyl (silanol-) groups on their surface. The hydrophilic silica thus obtained can be modified with some surface-treatment agents, e.g. silanes to convert at least a part of free hydroxyl groups on their surface to substituted with silanes hydroxyl groups and impart hydrophobic properties to silica.

The terms "hydrophobized" and "hydrophobic" are analogous in the context of the present invention and relate to the particles having a low affinity for polar media such as water. The hydrophilic particles, by contrast, have a high affinity for polar media such as water. The hydrophobicity of the hydrophobic materials can typically be achieved by the application of appropriate nonpolar groups to the silica surface. The extent of the hydrophobicity of a hydrophobic silica can be determined via parameters including its methanol wettability, as described in detail, for example, in WO2011/076518 A1, pages 5-6. In pure water, a hydrophobic silica separates completely from the water and floats on the surface thereof without being wetted with the solvent. In pure methanol, by contrast, a hydrophobic silica is distributed throughout the solvent volume; complete wetting takes place. In the measurement of methanol wettability, a maximum methanol content at which there is still no wetting of the silica is determined in a methanol/water test mixture, meaning that 100% of the silica used remains separate from the test mixture after contact with the test mixture, in unwetted form. This methanol content in the methanol/water mixture in % by volume is called methanol wettability. The higher the level of such methanol wettability, the more hydrophobic the silica. The lower the methanol wettability, the lower the hydrophobicity and the higher the hydrophilicity of the material.

The hydrophobized granular material of the invention has a methanol wettability of methanol content greater than 5%, preferably of 10% to 80%, more preferably of 15% to 70%, especially preferably of 20% to 65%, most preferably of 25% to 60%, by volume in a methanol/water mixture.

The hydrophobized granular material used in the composition of the invention comprises at least one IR-opacifier. Such an IR-opacifier reduces the infrared transmittance of a heat-insulating material and thus minimizes the heat transfer due to radiation. Preferably, the IR-opacifier is selected from the group consisting of silicon carbide, titanium dioxide, zirconium dioxide, ilmenites, iron titanates, iron oxides, zirconium silicates, manganese oxides, graphites, carbon blacks and mixtures thereof. The particle size of the IR-opacifiers is generally between 0.1 and 25 µm.

The hydrophobized granular material used in the thermal insulating composition of the present invention has a relatively low content of free hydroxyl groups, such as silanol hydroxyl groups (Si—OH) on the surface. The hydrophobized granular material used in the composition of the invention has a hydroxyl group content of no greater than 0.12 mmol OH/g, more preferably less than 0.10 mmol OH/g, most preferably less than 0.08 mmol OH/g. The free hydroxyl group content of silica or a material comprising silica can be determined by the method published by J. Mathias and G. Wannemacher in Journal of Colloid and Interface Science 125 (1988), pp 61-68 "Basic characteristics and applications of Aerosil: 30. The chemistry and physics of the Aerosil surface" by reaction with lithium aluminium hydride. Using the corresponding BET surface area of the used material, the free hydroxyl group content in mmol OH/g can be easily converted in number of hydroxyl groups per surface area [OH/nm$^2$]. The hydrophobized granular material used in the composition of the invention has preferably a hydroxyl group number per surface area of no greater than 1.0 OH/nm$^2$, more preferably less than 0.5 OH/nm$^2$, most preferably less than 0.4 OH/nm$^2$.

The hydrophobized granular material can contain from 30% to 95%, preferably from 40% to 90%, more preferably from 50% to 85%, by weight of silica, and from 5% to 70%, preferably from 10% to 50%, more preferably from 15% to 40%, by weight of the IR-opacifier.

Tamped densities of various pulverulent or coarse-grain granular materials can be determined according to DIN ISO 787-11:1995 "General methods of test for pigments and extenders—Part 11: Determination of tamped volume and apparent density after tamping". This involves measuring the apparent density of a bed after agitation and tamping. The hydrophobized granular material used in the composition of the invention can have a tamped density of up to 300 g/L, preferably of 50 to 250 g/L, preferably of 100 to 240 g/L, more preferably of 130 to 230 g/L.

The hydrophobized granular material used in the composition of the invention possesses particular mechanical strength, when compared with similar silica-based materials known from the prior art.

Mechanical strength of the granular material can be measured by means of the measurement of the compressive stress that arises under pressure in the bed consisting of such materials. Such a measurement of compressive strength can be made in accordance with DIN EN 826:2013 "Thermal insulating products for building applications—Determination of compression behaviour". The standard method according to this standard specification is determining the compressive strength of sheets at 10% compression. This is less optimal in the case of bulk materials than in the case of sheets because of an inherently excessive roughness at the bed surface. This roughness would increase the measurement inaccuracy too significantly when the degrees of compression are too small, for example at 10% compression. Consequently, for the hydrophobized granular materials used in the present invention, the measurement of compressive strength can preferably be undertaken according to DIN EN 826:2013 at 50% compression, where the compressive strength is measured on a bed with a square face with edge length of 200 mm and bed height 20 mm. The lateral edging can take the form of a flexible foam that keeps the sample in position during the preparation.

A compressive force can be measured here at 50% compression, which can be converted to a compressive strength over the area of the sample:

$$\sigma_{50}=F_{50}/A,$$

where $\sigma_{50}$ is a compressive strength in Pa at compression $\varepsilon=50\%$; $F_{50}$— a measured compression force in N; A—a cross-sectional area of the specimen in m$^2$ (in the present case A=0.04 m$^2$).

Compression $\varepsilon$ is defined here as the ratio of the reduction in thickness of the specimen (in the present case, bed consisting of the granular material of the invention) to its starting thickness, measured in stress direction.

In a preferred embodiment of the invention, the hydrophobized granular material has a compressive strength according to DIN EN 826:2013 at 50% compression of greater than 150 kPa, preferably of greater than 200 kPa, more preferably of greater than 300 kPa, most preferably of 300 to 5000 kPa, where the compressive strength is measured on a bed with a square face, having edge length 200 mm and bed height 20 mm.

A numerical median particle size of the hydrophobized granular material can be determined according to ISO 13320:2009 by laser diffraction particle size analysis. The resulting measured particle size distribution is used to define the median $d_{50}$, which reflects the particle size not exceeded by 50% of all particles, as the numerical median particle size. The hydrophobized granular material used in the composition of the invention may have a $d_{50}$ of greater than 10 μm, is preferably from 20 to 4000 μm, more preferably from 50 to 3500 μm, especially preferably from 100 to 3000 μm.

The granular material used in the composition of the invention preferably comprises only the particles with a size of not more than 6000 μm, preferably 50 to 5000 μm, more preferably of 200 to 4000 μm, determined by dynamic image analysis according to ISO 13322-2:2006. For some applications, it can be preferable if the hydrophobized granular material is essentially free of particles smaller than 200 μm.

The hydrophobized granular material used in the composition of the invention is notable for particularly high stability combined with relatively low tamped density. Therefore, with the hydrophobized granular material used in the composition of the invention, it is often the case that undesired material abrasion and fracture during the preparation of compositions comprising such granulate, such as the thermal insulation composition of the present invention, are eliminated or reduced.

The hydrophobized granular material may have a BET surface area of greater than 20 m²/g, preferably of 30 to 500 m²/g, more preferably of 50 to 400 m²/g. In some particular cases, the hydrophobized granular material with a BET surface area of 120 to 300 m²/g, most preferably of 130 to 200 m²/g may be particularly preferable. The specific surface area, also referred to simply as BET surface area, is determined according to DIN 9277:2014 by nitrogen adsorption in accordance with the Brunauer-Emmett-Teller method.

The thermal insulating composition of the invention contains 5 to 60% by weight of a hydrophobized granular material comprising fumed silica and at least one IR-opacifier, and 40 to 95% by weight of an inorganic and/or an organic binder. The weight ratios of the granular material and of the binder in such a thermal insulating composition may significantly vary depending on the amount of water and/or other solvents present in the thermal insulating composition. Thus, in a ready for application ("wet", "liquid") thermal insulating composition, the ratio of the binder, which may contain water or other solvents, is normally higher. In this case, the thermal insulating composition of the present invention may contain 5 to 40, more preferably 7 to 30% by weight of a hydrophobized granular material comprising fumed silica and at least one IR-opacifier, and 60 to 95, more preferably 70 to 93% by weight of an inorganic and/or an organic binder. After applying of such a "wet" thermal insulating composition onto the surface to be isolated, the solvents are usually at least partially removed, leaving a "dried", usually solid thermal insulating composition containing 15 to 60, more preferably 20 to 60% by weight of a hydrophobized granular material comprising fumed silica and at least one IR-opacifier, and 40 to 85, more preferably 40 to 80% by weight of an inorganic and/or an organic binder.

The thermal conductivity of the thermal insulating composition of the invention and of the hydrophobized granular material used in the composition can be measured according to EN 12667:2001 by the method with the guarded hot plate (GHP) and the heat flow meter instrument. The mean measurement temperature here is 10° C. and the contact pressure 250 Pa; the measurement is conducted under air atmosphere at standard pressure.

The thermal conductivity of the thermal composition in the form of a sheet or a flat mould, measured according to EN 12667:2001, at a mean measurement temperature of 10° C., a contact pressure of 250 Pa under an air atmosphere and at standard pressure, is preferably less than 100 mW/(m*K), more preferably from 10 to 95, especially preferably from 15 to 90 and most preferably from 20 to 85 mW/(m*K).

The thermal conductivity of the hydrophobized granular material in the form of a bed, measured according to EN 12667:2001, at a mean measurement temperature of 10° C., a contact pressure of 250 Pa under an air atmosphere and at standard pressure, is preferably less than 50 mW/(m*K), more preferably from 10 to 45, especially preferably from 15 to 40 and most preferably from 20 to 35 mW/(m*K).

The thermal insulating composition according to the invention comprises at least one binder, which joins the individual parts of the cured composition to one another and optionally to one or more fillers and/or other additives and can thus improve the mechanical properties of the cured composition. Such a binder can contain organic or inorganic substances. The binder preferably contains organic substances. Organic binders can, for example, be selected from the group consisting of (meth)acrylates, alkyd resins, epoxy resins, gum Arabic, casein, vegetable oils, polyurethanes, silicone resins, wax, cellulose glue and mixtures thereof. Such organic substances can lead to the chemical curing of the thermal insulating composition used, for example by polymerization, crosslinking reaction or another type of chemical reaction or by physical curing by evaporation of the solvents or other volatile components of the binder. Chemical curing can take place, for example, thermally or under the action of UV radiation or other radiation.

In addition to the organic binder or as an alternative thereto, the thermal insulating composition of the invention can contain inorganic curable substances. Such inorganic binders, also referred to as mineral binders, have essentially the same task as the organic binders, that of joining additive substances to one another. Furthermore, inorganic binders are divided into non-hydraulic binders and hydraulic binders. Non-hydraulic binders are water-soluble binders such as calcium lime, Dolomitic lime, gypsum and anhydrite, which only cure in air. Hydraulic binders are binders which cure in air and in the presence of water and are water-insoluble after the curing. They include hydraulic limes, cements, masonry cements. The mixtures of different inorganic binders can also be used in the thermal insulating composition of the present invention.

The curing of the thermal insulating composition can be achieved by at least partial removal of the solvent. Depending on the system used, this step can preferably take place at a temperature of from 0 to 500° C., particularly preferably from 5 to 400° C., very particularly preferably from 10 to 300° C. The curing can take place in the presence of air or with exclusion of oxygen, for example under a protective-gas atmosphere of nitrogen or carbon dioxide. Said step can take place under standard pressure or under a reduced pressure, for example under vacuum.

Apart from the granular material and the binder, the thermal insulating composition according to the invention can additionally contain at least one solvent and/or filler and/or other additives.

The solvent used in the composition of the invention can be selected from the group consisting of water, alcohols, aliphatic and aromatic hydrocarbons, ethers, esters, aldehydes, ketones and the mixtures thereof. For example, the solvent used can be water, methanol, ethanol, propanol, butanol, pentane, hexane, benzene, toluene, xylene, diethyl ether, methyl tert-butyl ether, ethyl acetate, acetone. Particularly preferably, the solvents used in the thermal insulating composition have a boiling point of less than 300° C., particularly preferably less than 200° C. Such relatively volatile solvents can be easily evaporated or vaporized during the curing of the thermal insulating composition according to the invention.

The present invention further provides a process (A) for producing a thermal insulating composition, comprising the following steps:
a) mixing a hydrophilic silica with at least one IR-opacifier;
b) densifying the mixture obtained in step a) to give a hydrophilic granular material;
c) subjecting the hydrophilic granular material produced in step b) to thermal treatment at a temperature of 200 to 1200° C.;
d) hydrophobizing the hydrophilic granular material subjected to thermal treatment in step
c) with a hydrophobizing agent to obtain a hydrophobized granular material;
e) mixing the hydrophobized granular material produced in step d) with an inorganic and/or an organic binder.

The invention also provides a further process (B) for producing a thermal insulating composition, comprising the following steps:
a) mixing a hydrophilic silicon dioxide with at least one IR-opacifier;
b) densifying the mixture obtained in step a) to give a hydrophilic granular material;
c) treating the hydrophilic granular material produced in step b) with ammonia;
d) hydrophobizing the hydrophilic granular material treated with ammonia in step c) with a hydrophobizing agent to obtain a hydrophobized granular material;
e) mixing the hydrophobized granular material produced in step d) with an inorganic and/or an organic binder.

The above-described thermal composition of the invention can be produced, for example, by process (A) or (B).

Steps a) and b) of the processes (A) and (B) according to the invention can be conducted as individual, separate stages, or alternatively in combination in one process step.

Mixing of the hydrophilic silica with at least one IR-opacifier as per step b) of process (A) or process (B) can be conducted with all suitable mixing apparatus known to those skilled in the art.

Densification of the mixture obtained in step a) to give a granular material as per step b) of process (A) or process (B) can be conducted by deaeration or compaction.

Thermal treatment of the granular material produced in step b) in process (A) can be conducted at temperatures of 200 to 1500° C., preferably of 400 to 1400° C., preferably of 500 to 1200° C., more preferably of 600 to 1100° C., most preferably of 800 to 1100° C.

In step c) of process (B) according to the invention, the treatment of the granular material produced in step b) with ammonia takes place, preferably gaseous ammonia. The duration over which step c) of process (B) according to the invention is conducted depends upon factors including the composition of the shaped thermal insulating body and the thickness thereof. The duration is generally from 10 minutes to 100 hours, preferably 0.5 to 20 hours. Preferred temperatures here are in the range from 0 to 200° C., more preferably from 20 to 100° C.

For the treatment with ammonia in step c) of process (B) according to the invention, ammonia can be introduced into the chamber envisaged for the purpose together with the granular material to be treated. The chamber merely has to meet the requirement that it is capable of maintaining the pressures and temperatures necessary in the process according to the invention. The pressure differential $\Delta p = p2-p1$, with p1=pressure in the chamber prior to introduction of the gaseous ammonia, p2=pressure in the chamber at which the introduction of the gaseous ammonia is stopped, is preferably more than 20 mbar, more preferably from 50 mbar to 5 bar, especially preferably from 100 mbar to 500 mbar, most preferably from 200 mbar to 400 mbar.

In addition to ammonia, in step c) of process (B), steam can be added to the granular material produced beforehand, preferably at a relative vapour pressure of 50% to 95%. The hydrophobizing agent used in step d) of process (A) or (B) may comprise a silicon compound which is preferably selected from the group consisting of halosilanes, alkoxysilanes, silazanes and siloxanes.

A silicon compound of this kind is more preferably a liquid compound having at least one alkyl group and a boiling point of less than 200° C. It is preferably selected from the group consisting of $CH_3SiCl_3$, $(CH_3)_2SiCl_2$, $(CH_3)_3SiCl$, $C_2H_5SiCl_3$, $(C_2H_5)_2SiCl_2$, $(C_2H_5)_3SiCl$, $C_3H_8SiCl_3$, $CH_3Si(OCH_3)_3$, $(CH_3)_2Si(OCH_3)_2$, $(CH_3)_3SiOCH_3$, $C_2H_5Si(OCH_3)_3$, $(C_2H_5)_2Si(OCH_3)_2$, $(C_2H_5)_3SiOCH_3$, $C_3H_{15}Si(OC_2H_5)_3$, $C_3H_{15}Si(OCH_3)_3$, $(H_3C)_3SiNHSi(CH_3)_3$ and mixtures thereof. Particular preference is given to $(H_3C)_3SiNHSi(CH_3)_3$ (xexamethyldisilazane, HMDS) and $(CH_3)_2SiCl_2$ (dichlorodimethylsilane).

In the process (A) or (B) according to the invention, step b) and/or c) and/or d) may be followed by a separation of fractions of the granular material of different size from one another in such a way that only one or more fractions having particular particle sizes are separated off and used further.

Step e) of either process (A) or (B) may be accomplished with all suitable mixing devices known in the art. Preferably, the hydrophobized granular material obtained in the steps a)-d) of either of process (A) or (B) is gradually added to the continually mixed, e.g. stirred mixture comprising a binder. The suitable intensity of mixing, e.g. the rate and the duration of stirring is preferably selected so as to ensure well mixing of the thermal insulation composition, but to avoid the mechanical attrition of the employed hydrophobized granular material.

The thermal insulating composition according to the invention can in general be used for thermal insulation, particularly for the thermal insulating of walls, roofs, houses, industrial plants, parts of industrial apparatuses, pipelines and suchlike. Similarly, this composition can be used for imparting acoustic insulation to the above-mentioned articles.

EXAMPLES

Preparation of Silica Granular Material a According to the Invention

Preparation of hydrophobized silica granular material containing IR-opacifier has been conducted according to PCT/EP2018/051142:

Mixing 1000F silicon carbide (Carsimet), manufacturer: Keyvest, 20% by weight, and AEROSIL® 300 hydrophilic silica (BET=300 m²/g, manufacturer: EVONIK Resource Efficiency GmbH), 80% by weight, were mixed by means of a Minox PSM 300 HN/1 MK ploughshare mixer.

Densification

The mixture of AEROSIL® 300 with silicon carbide produced above was densified with a Grenzebach densifying roll (Vacupress VP 160/220). The tamped density of the granular material obtained was adjusted via the contact pressure, the roll speed and the reduced pressure applied.

The vacuum applied was less than 300 mbar, absolute. The roll speed was 5 rpm, and the pressure was 2000 N. The obtained particles were processed in an oscillating sieve mill with mesh size 3150 μm (manufacturer: FREWITT), in order to establish an upper particle limit and hence remove the particles larger than this upper limit.

Sintering/Hardening

The subsequent thermal hardening was effected in an XR 310 chamber kiln from Schröder Industrieöfen GmbH. For this purpose, multiple layers with a bed of height up to 5 cm were subjected to a temperature programme. The temperature ramp was 300 K/h up to the target temperature of 950° C.; the hold time was 3 hours; then the samples were cooled (without active cooling) until removal.

Hydrophobization

The final hydrophobization of the thermally hardened granular material was effected at elevated temperatures over the gas phase. For this purpose, hexamethyldisilazane (HMDS) as hydrophobizing agent was evaporated and conducted through by the reduced pressure process in accordance with the process from Example 1 of WO 2013/013714 A1. The specimens were heated to more than 100° C. in a desiccator and then evacuated. Subsequently, gaseous HMDS was admitted into the desiccator until the pressure had risen to 300 mbar. After the sample had been purged with air, it was removed from the desiccator.

Sieving/Fractionation

The thermally hardened granular material was fractionated in the desired particle fractions, for example from 200 to 1190 μm or from 1190 to 3150 μm. This was done using a vibrating sieve from Sweco, model LS18S. Granular material A had a tamped density of ca. 190 g/L.

Preparation of Silica Granular Material B According to the Invention

AEROSIL® 200 hydrophilic silica (BET=200 m$^2$/g, manufacturer: EVONIK Resource Efficiency GmbH) was used instead of AEROSIL® 300 for granular material A. Otherwise, the manufacturing procedure for granular material B has been identical to that for granular material A. Granular material B had a tamped density of ca. 165 g/L.

Preparation of Silica Granular Material C (Comparative Example)

Mixing 1000F silicon carbide (Carsimet), manufacturer: Keyvest, 20% by weight, and AEROSIL® R 812 hydrophobic silica (produced from hydrophilic Aerosil® 300 with BET=300 m$^2$/g, hydrophobized with HMDS, manufacturer: EVONIK Resource Efficiency GmbH), 80% by weight, were mixed by means of a Minox PSM 300 HN/1 MK ploughshare mixer.

Densification

The mixture of AEROSIL® R 812 with silicon carbide produced as described above was densified with a Grenzebach densifying roll (Vacupress VP 160/220). The tamped density of the granular material obtained was adjusted via the contact pressure, the roll speed and the reduced pressure applied. The vacuum applied was less than 300 mbar, absolute. The roll speed was 5 rpm, and the pressure was 2000 N. The obtained particles were processed in an oscillating sieve mill with mesh size 3150 μm (manufacturer: FREWITT), in order to establish an upper particle limit and hence remove the particles larger than this upper limit.

Sieving/Fractionation

The densified granular material was fractionated in the desired particle fractions, for example from 200 to 1190 μm or from 1190 to 3150 μm. This was done using a vibrating sieve from Sweco, model LS18S. Granular material C had a tamped density of ca. 165 g/L.

Preparation of Silica Granular Material D (Comparative Example)

Mixing 1000F silicon carbide (Carsimet), manufacturer: Keyvest, 20% by weight, and AEROSIL® R 974 hydrophobic silica (produced from hydrophilic Aerosil® 200 with BET=200 m$^2$/g, hydrophobized with dimethyldichlorosilane, manufacturer: EVONIK Resource Efficiency GmbH), 80% by weight, were mixed by means of a Minox PSM 300 HN/1 MK ploughshare mixer.

Densification

The mixture of AEROSIL® R 974 with silicon carbide produced as described above was densified with a Grenzebach densifying roll (Vacupress VP 160/220). The tamped density of the granular material obtained was adjusted via the contact pressure, the roll speed and the reduced pressure applied. The vacuum applied was less than 300 mbar, absolute. The roll speed was 5 rpm, and the pressure was 2000 N. The obtained particles were processed in an oscillating sieve mill with mesh size 3150 μm (manufacturer: FREWITT), in order to establish an upper particle limit and hence remove the particles larger than this upper limit.

Sieving/Fractionation

The densified granular material was fractionated in the desired particle fractions, for example from 200 to 1190 μm or from 1190 to 3150 μm. This was done using a vibrating sieve from Sweco, model LS18S. Granular material D had a tamped density of ca. 230 g/L.

Determination of OH-Group Density

The hydroxyl group density was determined by the method published by J. Mathias and G. Wannemacher in Journal of Colloid and Interface Science vol. 125, pages 61-68 (1988) by reaction with lithium aluminium hydride.

The measured hydroxy group contents of granular materials A-D are summarized in Table 1 below. Using the known surface areas of granular materials, these hydroxyl group values in mmol/g can be converted into the number of OH-groups per nm$^2$ of surface area (Table 1).

Preparation of Thermal Insulating Compositions (TIC), Determination of Maximal Loading of Granular Material in TIC.

Binder (Acronal Eco 6270, manufacturer: BASF, 276 g) was filled into a cylindrical glass vessel with 9.5 cm diameter and stirred with a propeller stirrer at 600 rpm. Granular materials (sieve fraction 200-1190 μm) were gradually added to the stirred binder, and the stirring was continued until a homogeneous mixture has been achieved, i.e. all granular material was incorporated into the mixture with a binder.

The maximum loading is determined by a gradual adding of the granular material to the binder. The granules are added until a substantial increase of viscosity is observed, which makes the incorporation of further granular material into the polymeric binder matrix impossible and the added granules remain separated from the thermal insulating composition.

Maximal loadings of granular materials A-D in TICs in % by weight, related to the total weight of wet TIC (not dried, still contains water) with granular material, are summarized in Table 1 below.

Preparation of Thermal Insulating Compositions (TICs) and Determination of their Thermal Conductivity.

Binder (267 g Acronal Eco 6270, manufacturer: BASF) was filled into a cylindrical glass vessel with 9.5 cm diameter and stirred with a propeller stirrer at 600 rpm. Granules (33 g, sieve fraction 200-1190 μm) were gradually added to the stirred binder, and the stirring was continued until a homogeneous mixture has been achieved, i.e. all the granules were incorporated into the mixture with a binder.

The formulation is filled in a frame to obtain an approximately 1 cm thick wet TIC. The TIC is pre-dried for 48 hours under ambient conditions and for 24 hours at 80° C. in an oven to remove all remaining water of binder. The dry TIC is flattened by a mortising machine to obtain an even surface for the thermal conductivity measurement. The thermal conductivity was measured according to EN 12667:2001 by the method with the hot plate and the heat flow meter instrument. The mean measurement temperature is 10° C. and the contact pressure 250 Pa; the measurement was conducted under air atmosphere at standard pressure.

Thermal conductivities of granules A-D of dry TICs with a loading level of 11% by weight, related to the total wet weight of TIC with granules, are summarized in Table 1 below.

TABLE 1

Hydroxyl-group content, BET surface area, number pro surface area, maximal loadings of granular material in TICs and thermal conductivity of TICs.

|  | OH-groups content [mmol OH/g] | OH-groups number pro surface area [number/nm$^2$] | BET surface area [m$^2$/g] | Maximal loading of granular material in TICs [wt. % related to total weight of wet TIC with granular material] | Thermal conductivity of TICs containing 11 wt. % of granular material related to total weight of wet TIC with granular material [mW/(mK)] |
|---|---|---|---|---|---|
| Granular material A | 0.04 | 0.158 | 152 | 22.2 | 82 |
| Granular material B | 0.09 | 0.475 | 114 | 20.5 | 89 |
| Granular material C | 0.13 | 0.455 | 172 | 15.2 | 113 |
| Granular material D | 0.22 | 1.027 | 129 | 17.5 | 111 |

Granular material A, possessing significantly lower OH-groups content than granular material C (both with comparable BET surface areas of 152 and 172 m$^2$/g, respectively), shows higher maximal loading of granular material in the respective thermal insulation coating (22.2 vs 15.2% by weight). Granular material B, possessing significantly lower OH-groups content than granular material D (both with comparable BET surface areas of 114 and 129 m$^2$/g, respectively), in turn shows higher maximal loading of granular material in the respective thermal insulation coating (20.5 vs 17.5% by weight). Both granular materials A and B show significantly lower values of thermal conductivity (82 and 89 mW/(mK), respectively), than granular materials C and D (113 and 111 mW/(mK), respectively) in similar TICs with 11% by weight content of the granules.

Viscosity Measurement

A rotational viscometer Brookfield DV2T Extra was used to conduct measurements of the dynamic viscosity of the formulations (mixture of binder and granular material). Spindles and rotational velocity were chosen according to the given viscosity range in the manual.

General Experiment Description for Measuring Viscosity of Compositions with Granular Materials after Various Storage Times Preparation of the Formulations:

Binder (Acronal Eco 6270, manufacturer: BASF, 276 g) was filled into a cylindrical glass vessel with 9.5 cm diameter and stirred with a propeller stirrer at 600 rpm. Granular materials (24 g, sieve fraction 200-1190 µm) were gradually added to the stirred binder, and the stirring was continued until a homogeneous mixture has been achieved, i.e. all the granular material were incorporated into the mixture with a binder.

Measurements:

The dynamic viscosity of all samples was measured immediately after their preparation. The samples were closed with an impermeable lid and additionally sealed with a Parafilm M foil. The thus closed samples were stored at room temperatures (25° C.) without stirring, opened after defined time of storage for a measurement of the dynamic viscosity, as previously described, and closed again for further storage. For three weeks, all samples were measured twice a week to observe their thickening behaviour.

TABLE 2

Viscosity of TICs with granular materials A and B over the time

| Example | Granular material | Storage time [days] | | | | | | |
|---|---|---|---|---|---|---|---|---|
| | | 0 | 4 | 7 | 12 | 15 | 19 | 22 |
| | | Viscosity [Poise] | | | | | | |
| Example 1 | A | 27 | 154 | 209 | 490 | 528 | 595 | 2112 |
| Example 2 | B | 26 | 539 | 696 | 667 | 2864 | 3136 | 3872 |

The results of the viscosity measurements after various storage time are summarized in Table 2. These results show that the compositions with granular materials A and B are both stable at testing conditions, wherein the granular material A with the higher BET surface area (152 m$^2$/g vs 114 m$^2$/g for the granular material B) leads to lower viscosity of TIC than granular material B after the same storage time.

The invention claimed is:

1. A thermal insulating composition, containing 5 to 60% by weight of a hydrophobized granular material comprising fumed silica and at least one IR-opacifier, and 40 to 95% by weight of an inorganic and/or an organic binder, wherein the hydrophobized granular material has a content of free hydroxyl groups of no greater than 0.12 mmol/g, as determined by reaction with lithium aluminium hydride.

2. The thermal insulating composition of claim 1, wherein the IR-opacifier is selected from the group consisting of: silicon carbide; titanium dioxide; zirconium dioxide; ilmenites; iron titanates; iron oxides; zirconium silicates; manganese oxides; graphites; carbon blacks; and mixtures thereof.

3. The thermal insulating composition of claim 1, wherein the hydrophobized granular material contains from 30% to 95% by weight of fumed silica, and from 5% to 70%, by weight of the IR opacifier.

4. The thermal insulating composition of claim 1, wherein the hydrophobized granular material has a tamped density of 50 to 250 g/L.

5. The thermal insulating composition of claim 1, wherein the hydrophobized granular material has a thermal conductivity of less than 50 mW/(m*K) according to EN 12667: 2001, measured in a bed, at a mean measurement temperature of 10° C., a contact pressure of 250 Pa under an air atmosphere and at standard pressure.

6. The thermal insulating composition of claim 1, wherein the hydrophobized granular material has a methanol wettability of 10 to 80% by volume methanol in a methanol/water mixture.

7. The thermal insulating composition of claim 1, wherein the hydrophobized granular material has a numerical median particle size $d_{50}$ of greater than 10 μm.

8. The thermal insulating composition of claim 1, wherein the hydrophobized granular material is free of particles smaller than 200 μm.

9. The thermal insulating composition of claim 1 wherein the inorganic binder is selected from the group consisting of: lime; gypsum; cements; and mixtures thereof.

10. The thermal insulating composition of claim 1 wherein the organic binder is selected from the group consisting of: (meth)acrylates; alkyd resins; epoxy resins; gum arabic, casein; vegetable oils; polyurethanes; silicone resins; wax; cellulose glue; and mixtures thereof.

11. The thermal insulating composition of claim 1, wherein the composition has a thermal conductivity of less than 100 mW/(m*K) according to EN 12667:2001, measured at a mean measurement temperature of 10° C., a contact pressure of 250 Pa under an air atmosphere and at standard pressure.

12. The thermal insulating composition of claim 2, wherein the hydrophobized granular material contains from 30% to 95% by weight of fumed silica, and from 5% to 70%, by weight of the IR opacifier.

13. The thermal insulating composition of claim 12, wherein the hydrophobized granular material has a tamped density of 50 to 250 g/L.

14. The thermal insulating composition of claim 12, wherein the hydrophobized granular material has a thermal conductivity of less than 50 mW/(m*K) according to EN 12667:2001, measured in the bed, at a mean measurement temperature of 10° C., a contact pressure of 250 Pa under an air atmosphere and at standard pressure.

15. The thermal insulating composition of claim 14, wherein the hydrophobized granular material has a methanol wettability of 10 to 80% by volume methanol in a methanol/water mixture.

16. The thermal insulating composition of claim 14, wherein the hydrophobized granular material has a numerical median particle size $d_{50}$ of greater than 10 μm.

17. A process for producing the thermal insulating composition of claim 16, comprising the following steps:
 a) mixing a hydrophilic fumed silica with at least one IR-opacifier;
 b) densifying the mixture obtained in step a) to give a hydrophilic granular material;
 c) subjecting the hydrophilic granular material produced in step b) to thermal treatment at a temperature of 200 to 1200° C.;
 d) hydrophobizing the hydrophilic granular material subjected to thermal treatment in step c) with a hydrophobizing agent to obtain a hydrophobized granular material; and
 e) mixing the hydrophobized granular material produced in step d) with an inorganic and/or an organic binder.

18. The process of claim 17, wherein the hydrophobizing agent used in step d) is selected from the group consisting of halosilanes, alkoxysilanes, silazanes and siloxanes.

19. A process for producing the thermal insulating composition of claim 1, comprising the following steps:
 a) mixing a hydrophilic fumed silica with at least one IR-opacifier;
 b) densifying the mixture obtained in step a) to give a hydrophilic granular material;
 c) treating the hydrophilic granular material produced in step b) with ammonia;
 d) hydrophobizing the hydrophilic granular material treated with ammonia in step c) with a hydrophobizing agent to obtain a hydrophobized granular material; and
 e) mixing the hydrophobized granular material produced in step d) with an inorganic and/or an organic binder.

20. The process of claim 19, wherein the hydrophobizing agent used in step d) is selected from the group consisting of halosilanes, alkoxysilanes, silazanes and siloxanes.

* * * * *